United States Patent [19]

Parkison

[11] 4,331,176

[45] May 25, 1982

[54] REPLACEABLE CARTRIDGE VALVE ASSEMBLY

[75] Inventor: Richard G. Parkison, Louisville, Ky.

[73] Assignee: American Standard Inc., New York, N.Y.

[21] Appl. No.: 126,938

[22] Filed: Mar. 3, 1980

[51] Int. Cl.³ .......................................... F16K 25/00
[52] U.S. Cl. ............................. 137/454.5; 137/454.6; 137/614.11; 137/625.31; 251/310; 251/368
[58] Field of Search ............ 137/454.5, 454.6, 614.11, 137/625.31; 251/310

[56] References Cited

U.S. PATENT DOCUMENTS

| | | | |
|---|---|---|---|
| 3,207,181 | 9/1965 | Willis | 137/625.31 |
| 3,645,289 | 2/1972 | Schmitt | 137/625.31 X |
| 3,645,493 | 2/1972 | Manoogian | 251/310 X |
| 3,807,455 | 4/1974 | Farrell | 137/625.31 |
| 3,831,621 | 8/1974 | Anthony | 137/625.31 X |
| 3,834,416 | 9/1974 | Parkison | 137/625.31 X |
| 4,175,586 | 11/1979 | Hayman | 137/614.11 |
| 4,250,912 | 2/1981 | Knapp | 137/454.6 X |

*Primary Examiner*—Harold W. Weakley
*Attorney, Agent, or Firm*—James J. Salerno, Jr.; Robert G. Crooks; John P. Sinnott

[57] ABSTRACT

A replaceable cartridge valve assembly adapted for use in a sanitary fitting which includes a pair of discs, each disc having at least one opening or orifice therein to provide the valving function and an auxiliary valve means is disclosed. The valve assembly is made in the form of a removable cartridge and includes an arrangement of the valve stem which cooperates with an opening in the cartridge housing to provide the auxiliary valve means for throttling downstream from the at least one disc orifice of the disc valve means to provide a stepdown in pressure drop and thereby inhibit and/or reduce cavitation and other objectionable noises.

14 Claims, 7 Drawing Figures

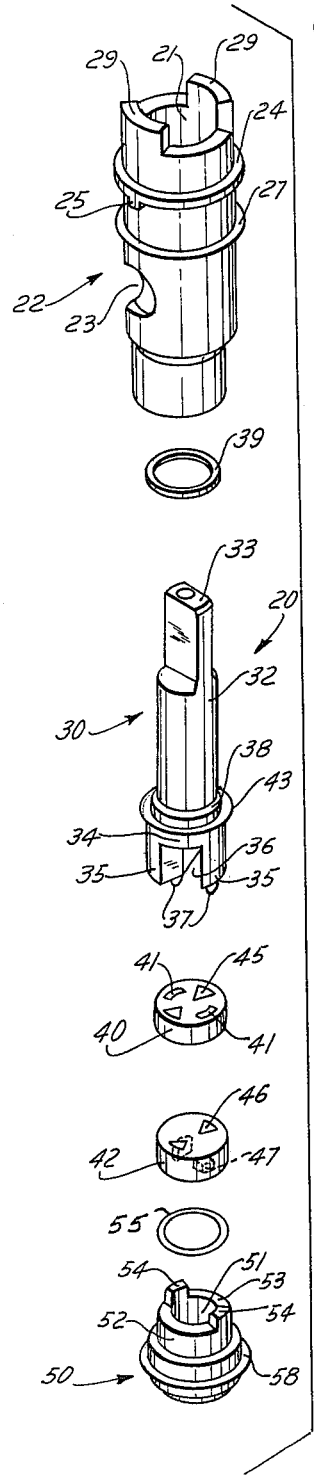
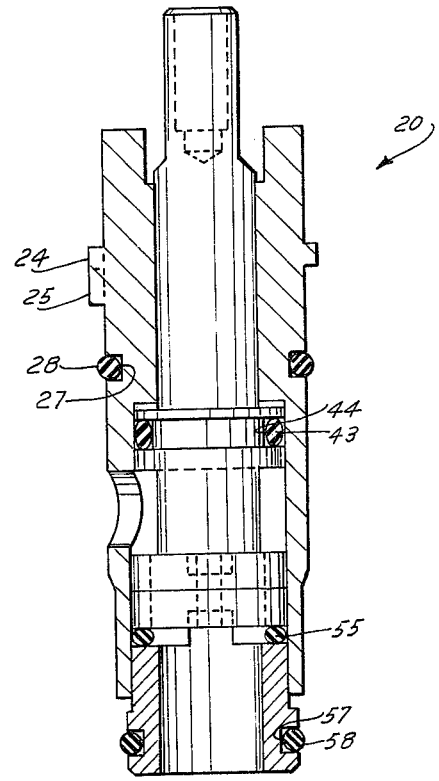
FIG. 3
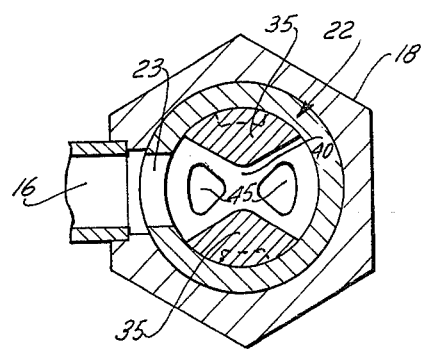
FIG. 4

REPLACEABLE CARTRIDGE VALVE ASSEMBLY

CROSS REFERENCE TO RELATED APPLICATIONS

This patent application discloses a valve assembly in the form of a removable cartridge for use in a sanitary fitting and is an improvement of the ceramic disc faucet described in my prior U.S. Pat. No. 3,810,602 and U.S. Pat. No. 3,834,416. The valve assembly utilizes disc valve means as well as auxiliary valve means for valving function so that cavitation and/or other objectional noises associated with the operation of the valve is inhibited and/or reduced.

BACKGROUND OF THE INVENTION

In the prior art, ceramic disc operated valve assemblies are known, for example, single control ceramic disc valves are utilized in sanitary fittings such as for kitchen and bathroom fixtures, see for example, U.S. Pat. Nos. 3,433,264, 3,533,436, and 3,736,959. Dual control disc valves, either metal or ceramic are also known, see for example, U.S. Pat. Nos. 2,923,318, 3,040,770, 3,780,758, 3,807,455, 3,810,602, 3,831,621, 3,834,416 and 4,175,586. Ceramic valving elements have also been used in float actuated rotating valves, see U.S. Pat. No. 3,465,782. While the prior art discloses the use of both metal and ceramic discs to provide the valving function in a sanitary fitting, the cavitation and noise level generally attributed to the operation of such valves may be objectionably high. To reduce the noise levels when operating ceramic valves, various improvements have been suggested such as modifying the shape of the mixing chamber or by use of noise eliminating means, see for example, U.S. Pat. Nos. 3,433,264, 3,574,810, 3,951,169, 4,105,043 and 4,157,099.

It is an object of the present invention to provide a valve assembly in the form of a removable cartridge which may be utilized in both the hot and cold water valve positions in a sanitary fitting and is interchangeable therewith.

Another object of the invention is to provide a valve assembly in the form of a removable cartridge which utilizes a pair of discs, each disc having an orifice therein to provide the valving function in which a unique arrangement of the stem cooperates with an outlet hole or opening in the cartridge housing to provide an auxiliary means for throttling water flow downstream from the orifices formed in the valve discs.

It is another object of the invention to provide a removable cartridge assembly for use in a dual controlled sanitary fitting to provide the valving function in which each cartridge assembly includes an auxiliary valve means for throttling system arranged and constructed to operate in a prescribed patterned relationship to control the volume of water flow through the cartridge housing simultaneously with the volume of water flow through the disc orifices to provide a stepdown pressure drop and thereby inhibit cavitation and/or other objectionable noises associated with its operation.

A further object of the invention is to provide a ceramic disc valve assembly in the form of a cartridge including a housing and stem made of moldable plastic materials and when assembled comprises a tamperproof unit which cannot be disassembled.

It is a further object of the invention to provide a ceramic disc cartridge assembly which is inexpensive to manufacture, easy to assemble and install in a valve body of a sanitary fitting.

The invention generally contemplates providing a replaceable valve assembly in the form of a cartridge adapted for insertion into a valve body of a sanitary fitting used for the control of water therethrough. The cartridge includes an axially, bored, cylindrical housing having open upper and lower ends, and an opening formed between the ends thereof; an elongated stem rotatably mounted therein; a first and second disc positioned within the housing and being in face-to-face movable contact and each disc having at least one inlet opening defining a water passageway therethrough. One end of the passageway of the first disc is positioned in fluid communication with the inlet opening defining a water passageway therethrough and is positioned so that relative movement between the discs will direct the at least one opening therein between a blocked, shut-off position with the openings out of alignment and the partially, and completely overlapped positions where water can flow through the discs. One of the discs is mounted in the housing and the other disc is connected to one end of the stem for rotation therewith. The cross-sectional area of the housing opening is substantially equal to the cross-sectional area of the at least one opening in the first and second discs. The stem and the housing cooperate with the housing opening to form auxiliary valve means which shifts from an opened to a closed position at substantially the rate as the at least one opening of the first and second discs. The auxiliary valve means provides a throttling of water flow downstream from the housing opening and the at least one opening formed in the discs which together operate in a patterned relationship to control the volume of water flow through the valve body simultaneously with the volume of water flow through the disc opening to provide a stepdown pressure drop and thereby inhibit cavitation and/or other objectionable noises associated with the operation of said valve.

BRIEF DESCRIPTION OF THE DRAWINGS

The invention may be carried into practice in a number of ways but a specific embodiment will now be described by way of example only, with reference to the accompanying drawings, in which:

FIG. 2 is an exploded isometric view of the cartridge assembly;

FIG. 3 is a sectional elevational view of the assembled cartridge of FIG. 2;

FIG. 4 is a sectional view of the valve assembly taken along lines 4—4 of FIG. 1 showing the discs and the auxiliary valves means in their open position;

DESCRIPTION OF THE PREFERRED EMBODIMENT

Figure 1:
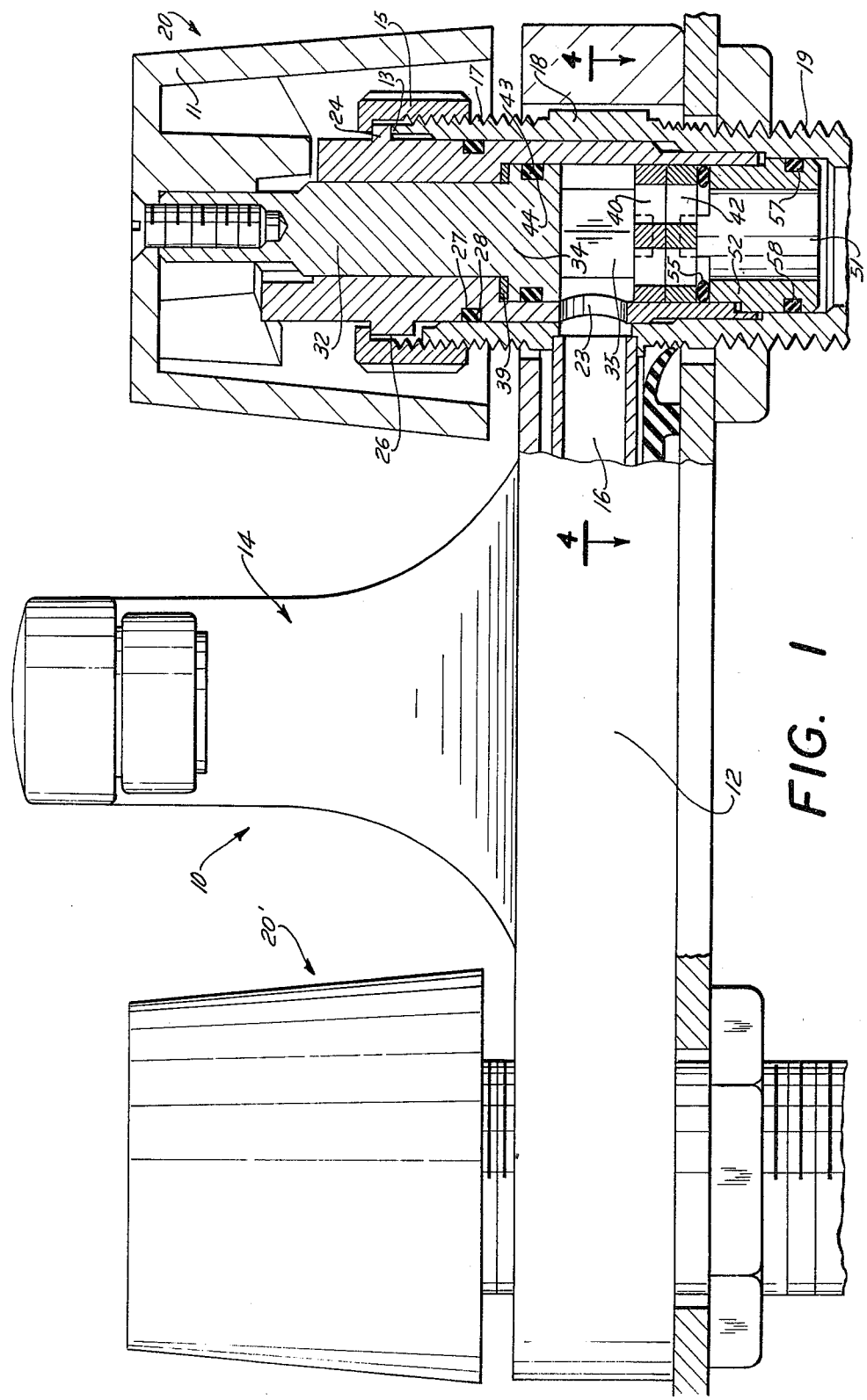
FIG. 1 is a front elevational view of a dual control sanitary fitting which is partly in cross-section taken along the axis of the cartridge assembly and illustrating the principal elements of this invention.

Throughout the drawing, the same or similar reference numerals will be employed to designate the same or similar parts wherever they occur.

Figure 5:
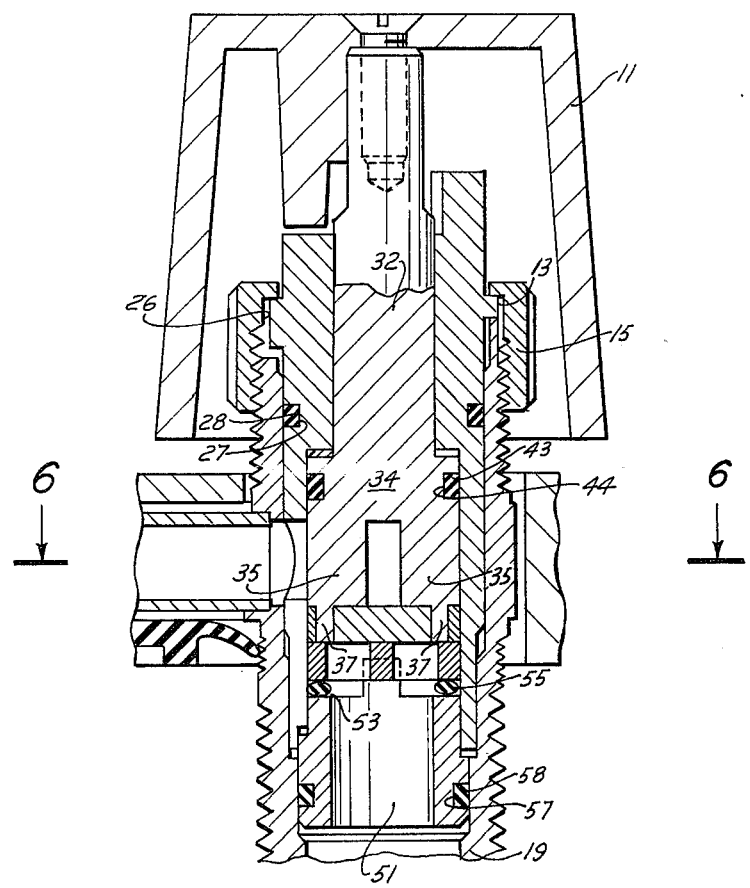
FIG. 5 is an enlarged sectional view in elevation of the cartridge assembly of FIG. 1 but is shown in its closed position.

In the illustrated embodiment, shown fully assembled in FIG. 1, sanitary fitting or faucet 10 is of the centerset type which consists of a faucet body 12, spout 14 and shut-off valves 20, 20' for the cold and warm water respectively. Shut-off valves 20, 20' are connected to spout 14 through water passageway 16 which is housed in faucet body 12. Cold and warm water shut-off valves 20, 20' are opened and closed by turning handle 11 and when opened together provide mixing of the cold and warm water passing through spout 14. Shut-off valves 20, 20' are removably mounted in faucet body 12 and each is insertable in tubular sleeve 18 which extends vertically through faucet body 12. Each end 17 and 19 of tubular sleeve 18 is threaded respectively to provide means for connecting cold and warm water thereto, not shown, and to removably mount valve 20, 20' in position by lock nut 15 as illustrated in FIGS. 1 and 5. Shut-off valves 20, 20' are formed having identical parts and exterior dimensions so that each may be interchanged one for the other. Thus, shut-off valves 20, 20' may be used interchangeably for either the cold or warm water valve trim.

FIG. 2 illustrates in exploded isometric view, the various elements comprising cold water valve 20. Warm water valve 20' and its various elements, not shown, are identical to the elements of cold water valve 20 so that a discussion of the assembly of cold water 20 is all that is required. Cold water valve 20 includes a valve or cartridge housing 22 having a longitudinal passageway 21 extending therethrough, a valve stem 30, a pair of discs 40 and 42 and a disc retainer 50. Valve housing 22 is tubular in shape and may be made from various rigid materials, such as, metal or moldable plastic. Valve housing 22 as illustrated, is made of a moldable plastic such as an acetal resin sold under the tradename Celcon. The exterior shape and dimensions of valve housing 22 are similar to interior shape and dimensions of tubular sleeve 18 so that when inserted therein, cold water valve 20 substantially nests adjacent to corresponding surfaces of tubular sleeve 18. Positioned between the ends and formed through the wall of valve housing 22 is opening 23 which is aligned with passageway 16 of faucet body 12 for discharging water through spout 14 of faucet 10. A radially extending flange 24 formed integrally with housing 22 is spaced from the upper end of valve housing 22 to provide a shoulder for nesting against the upper rim 13 of tubular sleeve 18. A slot 26 is formed in the rim 13 and is aligned with passage 16 of faucet body 12. A rib 25 is formed in the undersurface of flange 24 and is aligned with cartridge housing opening 23 so that when cartridge 20 is inserted into tubular sleeve 18, opening 23 will be in fluid communication with passage 16 of faucet body 12. An O-ring 28 is mounted in a circumferential groove 27 formed on the outer surface of valve housing 22 and positioned between flange 24 and opening 23 to provide a water tight seal between cartridge valve 20 and tubular sleeve 18. A pair of opposed lugs 29 are integrally formed on top of housing 22 so that handle 11 when mounted on stem 30 will rotate about 90° from a fully closed position to a fully opened position.

Stem 30 as illustrated in FIG. 2, is made of a moldable plastic material such as polymeric phenylene oxide sold under the tradename Noryl. Stem 30 is an elongated, cylindrical member having an upper section 32 and is provided with means for mounting handle 11 on end 33 thereof such as a screw threaded axially into the threaded opening in end 33. Upper section 32 of stem 30 has a diameter substantially equal to the internal diameter of the upper section of tubular sleeve 22 so as to provide a rotating sliding fit. The lower section 34 of stem 30 is of increased diameter and is substantially equal to the internal diameter of the lower section of tubular sleeve 18. Lower section 34 of stem 30 is integrally molded with upper section 32 and includes a pair of opposed, parallel and spaced apart legs or arms 35 to define a water passageway 36. The exterior surfaces of legs 35 are curved having the same radius of curvature as the lower section of tubular sleeve 22 so that legs 35 cooperate with the corresponding surfaces of housing 22 together with opening 23 to provide an auxiliary valve means. Projections or tabs 37 extend from the lower face of each leg 35 and provide means for mounting movable disc 40 on stem 30. Each tab 37 nests in a corresponding cavity 41 formed in the upper surface of disc 40 to rotatably mounted disc 40 thereto. Shoulder 38 is formed at the juncture of the upper and lower sections 32, 34 of stem 30 in which a Teflon washer 39 is mounted to provide an anti-friction bearing between the corresponding surfaces of the stem and cartridge housing to facilitate rotation of stem 30. O-ring 43 is mounted in circumferential groove 44 to prevent water from passing between upper section 32 of stem 30 and cartridge housing 22.

Disc retainer or tail piece 50 is tubular and has a central bore 51 extending longitudinally therethrough. Upper section 52 is formed having a reduced diameter on which is mounted lower disc 42 by upstanding projections or tabs 54, which nest into corresponding cavities 47 of disc 42, shown in dotted lines of FIG. 2. Disc 42 is mounted on disc retainer 50 and when positioned in cartridge housing 22 is in face-to-face water sealing contact with rotatably mounted upper disc 40 as shown in FIGS. 1, 3, and 5. O-ring 55 is mounted on the upper rim 53 of disc retainer 50 and provides a compression fit between the outer surfaces of O-ring 55 and the bottom surface of disc 42 for preventing water from passing between housing 22 and disc retainer 50. The compression of o-ring 55 at assembly provides a spring loaded force urging the ceramic discs together in intermediate sealing contact. When disc retainer 50 is mounted in the bottom or lower opening of housing 22 it is permanently bonded thereto preferably by sonic welding and cannot be removed without destroying the cartridge 10.

Discs 40, 42 are preferably made of ceramic material although metal or relative hard plastic material may be employed. The diameter of discs 40, 42 are substantially equal to the internal diameter of the lower section of cartridge housing 22. Upper and lower discs 40, 42 include a pair of identical spaced water passageways or openings 45 which are diametrically opposed and are symmetrically formed. Also upper and lower discs include a pair of identically spaced cavities 41, 47. When discs 40, 42 are mounted inface-to-face contact as shown in FIGS. 1, 3 and 5, cavities 41, 47 are positioned on the opposite face of the contacting surface of each disc so that projections 37 and 54 couple each disc in operative position in housing 22. As shown in FIG. 1, openings 45, 46 are in registry and provide a water passageway from the faucet water inlet opening and cartridge housing opening 23. Openings 45, 46 of discs 40, 42 have a cross-sectional area such that the sum of the area of each pair of openings are substantially equal to the cross-sectional area of cartridge housing opening 23. When stem 30 is rotated from its closed position to its fully opened position, the patterned relationship between cartridge housing opening 23 and disc openings 45, 46 are substantially identical since the rate of change of the cross-sectional area of the respective openings is substantially identical. The operation of the auxiliary valve means simultaneously with the disc valve means cooperates with the respective openings to maintain rate of opening and closing of the water passage through cartridge 20 to provide a reduction in noise level when compared to the operation of similar valves.

Disc retainer 50 is provided with a circumferential groove 57 in which O-ring 58 is mounted. Cartridge 20 is inserted into tubular sleeve 18 of faucet body 12 and O-rings 28, 58 provide a water tight fit between sleeve 18 and housing 22 by compression between the respective surfaces. Lock nut 15 is positioned over cartridge 20 and threaded onto the threaded end of tubular sleeve 18 to hold valve 20 in place. Handle 11 is mounted on the end of stem 30 by a screw as shown in FIGS. 1 and 5. Handle 11 can be rotated only about 90° since lugs 29 act as stops between its fully opened and closed positions. Sanitary fitting 10 is then ready to be mounted for use in a suitable installation such as a lavatory, kitchen sink bath or other well known types of valve environments related both to the single valve assembly or the mixing type valve assembly.

Cartridge valve 20 as shown fully assembled in FIG. 3 and mounted in faucet 10 shown in FIGS. 1 and 5, is insertable into tubular sleeve 18 and is interchangeable with the hot or cold water side of faucet 10. Cartridge valve 20 can be utilized for individual, not shown, as well as a mixing faucet for hot and cold water as shown in FIG. 1. Since disc retainer 50 is permanently mounted in cartridge housing 22, cartridge 20 is tamperproof and cannot be disassembled without the destruction of the cartridge housing 22. When discharging water through the spout of sanitary fitting 10, the improved operation of the cartridge valve assembly results in a reduction of the cavitation and/or other objectionable noises associated therewith.

Figure 6:
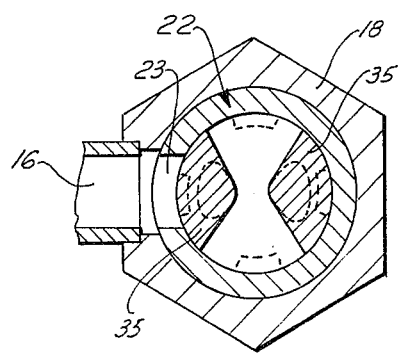
FIG. 6 is a sectional view of the valve assembly taken along lines 6—6 of FIG. 5 showing the discs and the auxiliary valve means in their closed position.
Figure 7:
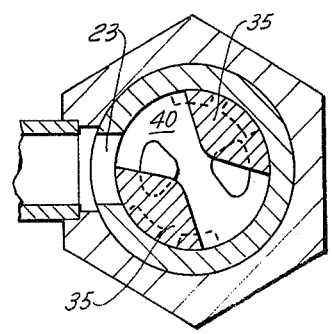
FIG. 7 is a view similar to FIGS. 4 and 6 but showing the discs and the auxiliary valve means of the valve assembly in their half open position.

As illustrated in the drawings in FIGS. 1, 4, 5, 6, and 7, the patterned relationship of the opening and closing of the auxiliary valve means together with the disc valve means as shown. In FIGS. 1 and 4, the auxiliary valve means and disc valve means is illustrated in their fully opened position, while FIGS. 5 and 6 illustrate the auxiliary valve means and disc valve means in their fully closed position. In FIG. 7 however, the auxiliary valve means and disc valve means are illustrated in their half opened position in which the cross-sectional area of opening 45, in disc 40 is relatively the same as the cross-sectional area of opening 23 of cartridge housing 22. Thus, as valve 20 is opened and closed the rate of change of the cross-sectional area opening 23 to that of opening 45 are substantially identical while maintaining the relative area of the respective openings substantially equal. This cooperation between the auxiliary valve means and the disc valve means provide a sanitary fitting in which the noise level is substantially reduced.

What is claimed is:

1. A replaceable valve assembly in the form of a cartridge adapted for insertion into a valve body of a sanitary fitting used for the control of water therethrough, said cartridge comprising:
   a cylindrical housing having an axial bore therethrough, said housing having open upper and lower ends, and a water discharge opening formed between the ends thereof;
   an elongated cylindrical stem rotatably mounted in said housing and having a diameter substantially equal to the internal diameter of said housing to provide a rotating sliding fit;
   first and second discs being in face-to-face movable contact with each other along a common plane, said first disc having at least one water passageway therethrough and adapted to be positioned at one end in fluid communication with an inlet opening in said open lower end of said elongated housing and at the other end adjacent said face of said second disc;
   said second disc having at least one water passageway therethrough and positioned so that relative movement between said discs will direct said at least one passageway therein between a blocked, shut-off position with the passageways being out of alignment and the partially, and completely overlapped positions where water can flow through said discs;
   said discs being mounted in the housing and one of said discs being connected to one end of said stem for rotation therewith;
   said water discharge opening of said housing having a cross-sectional area substantially equal to the cross-sectional area of said at least one passageway of said first and second discs to provide a water conduit for fluid communication between said water inlet opening and said water discharge openings in said housing;
   said stem and said housing cooperating to form an auxiliary valve means for throttling water flow downstream from said water discharge opening in said housing to said at least one passageway formed in said discs which together operate in a patterned, equal ratio relationship to control the volume of water flow through said valve housing simultaneously with the volume of water flow through said at least one disc passageway to provide a step-down in pressure drop and thereby inhibit cavitation and/or other objectionable noises associated with the operation of said valve.

2. The replaceable valve assembly of claim 1 wherein the first and second discs include a pair of identically spaced passageways which are diametrically opposed and comprise a cross-sectional area which are substantially equal to the cross-sectional area of said discharge opening in said cartridge housing.

3. The replaceable valve assembly of claim 1 wherein said first disc is immovably mounted in said cartridge housing and said second disc is mounted for rotation on said stem and said discs being formed of ceramic material.

4. The replaceable valve assembly of claim 1 wherein said stem is formed of a moldable, relatively rigid plastic material and includes a pair of spaced apart legs defining a water passageway therebetween, each leg having a curved outer surface complementary to said cartridge housing and cooperating therewith to provide a rotating sliding fit to form said auxiliary valve means for covering and uncovering said water discharge opening.

5. The replaceable valve assembly of claim 4 wherein said spaced apart legs each include a projection for rotatably mounting one of said discs to said stem.

6. The replaceable valve assembly of claim 1 wherein said cartridge including a tubular disc retainer which is made of a moldable plastic material, said disc retainer having disc mounting means for mounting one of said discs thereon in spanning relation so as to be positioned horizontally in said lower end of said cartridge housing, said disc being in face-to-face contact in water tight slidable connection with said other disc.

7. The replaceable valve assembly of claim 6 wherein said disc retainer and said cartridge housing are permanently bonded by sonic welding to prevent tampering with said valve assembly.

8. A sanitary fitting which inhibits cavitation and/or other objectional noises associated with the operation thereof, said fitting comprising:

a replaceable cartridge valve assembly removeably mounted in the valve body of said sanitary fitting;

said cartridge including a cylindrical housing, said housing having an axial bore therethrough, said housing having open upper and lower ends, and a water discharge opening formed between the ends thereof;

an elongated cylindrical stem rotatably mounted in said housing and having a diameter substantially equal to the internal diameter of said housing to provide rotating sliding fit;

disc valve means mounted in said housing and operably coupled to said stem;

said disc valve means including a first and second disc being in face-to-face movable contact with each other along a common plane, said first disc having at least one water passageway therethrough and positioned at one end in fluid communication with an inlet opening in said open lower end of said cylindrical housing and at the other end adjacent said face of said second disc;

said second disc having at least one water passageway therethrough and positioned so that relative movement between said discs will direct said at least one passageway therein between a blocked, shut-off position with the passageways being out of alignment and the partially, and completely overlapped positions where water can flow through said discs;

said water discharge opening of said housing having a cross-sectional area substantially equal to the cross-sectional area of said at least one passageway of said first and second discs to provide a water conduit for fluid communication between said water inlet opening and said water discharge opening of said housing; and said stem and said housing cooperating to form an auxiliary valve means for throttling water flow downstream from said water discharge opening in said housing to said at least one passageway formed in said discs which together operate in a patterned, equal ratio relationship to control the volume of water flow through said valve housing simultaneously with the volume of water flow through said at least one disc passageway to provide a step-down in pressure drop.

9. The sanitary fitting of claim 8 wherein the first and second discs include a pair of identically spaced openings which are diametrically opposed and comprise a cross-sectional area which are substantially equal to the cross-sectional area of said water discharge opening in said cartridge housing.

10. The sanitary fitting of claim 8 wherein said first disc is immovably mounted in said cartridge housing and said second disc is mounted for rotation on said stem.

11. The sanitary fitting of claim 8 wherein said stem is formed of a moldable, relatively rigid plastic material and includes a pair of spaced apart legs defining a water passageway therebetween, each leg having a curved outer surface complementary to said cartridge housing and cooperating therewith to form said auxiliary valve means for covering and uncovering said water discharge opening of said housing.

12. The sanitary fitting of claim 11 wherein said spaced apart legs each include a projection for rotatably mounting one of said discs to said stem.

13. The sanitary fitting of claim 8 wherein said cartridge housing includes a tubular disc retainer which is made of a moldable plastic material, said disc retainer having disc mounting means for mounting one of said discs thereon in spanning relation so as to be positioned horizontally in said lower open end of said cartridge housing, said disc being in face-to-face contact and in water tight slidable connection with said other disc.

14. The replaceable valve assembly of claim 13 wherein said disc retainer and said cartridge housing are permanently bonded by sonic welding to prevent tampering with said valve assembly.

* * * * *